(No Model.)
D. R. McKIM.
VALVE.
No. 468,029.
Patented Feb. 2, 1892.
Fig. 1.
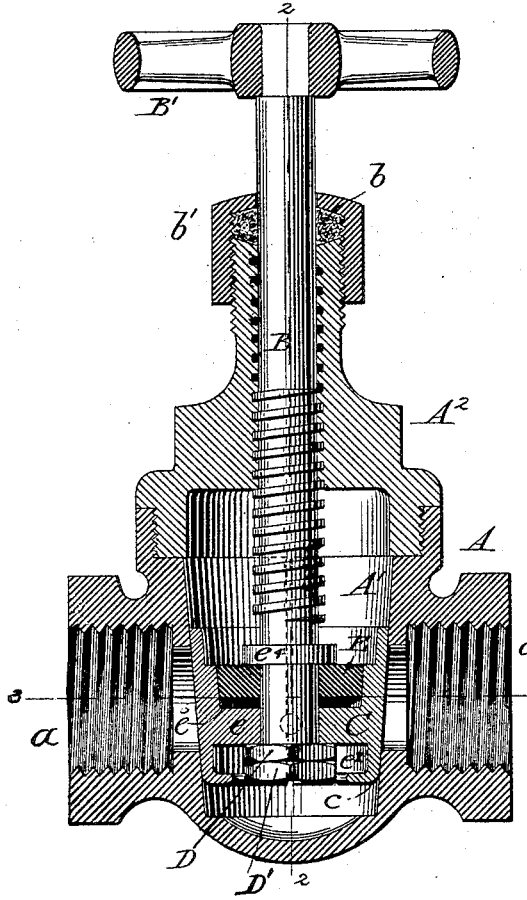
Fig. 2. ON LINE 2-2
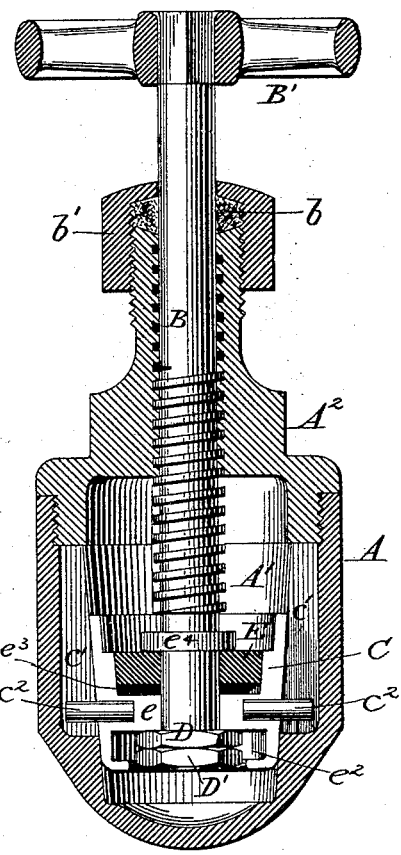
Fig. 3. ON LINE 3-3
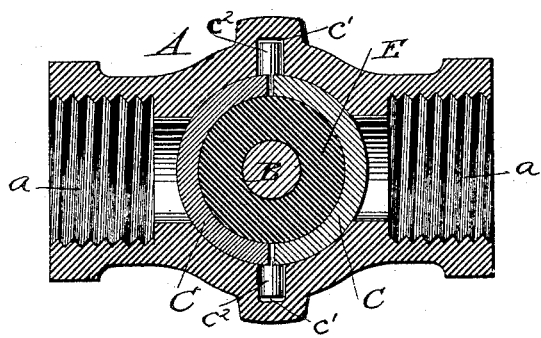
Fig. 4.
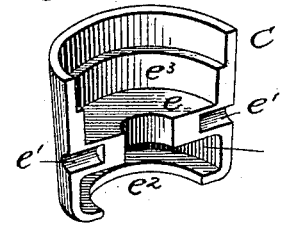
Fig. 5.
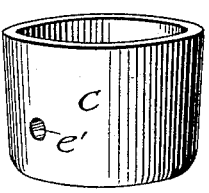
Witnesses;
Sidney P. Hollingsworth
Baltus DeLong
Inventor
David R. McKim
by his attorneys
Baldwin, Davidson & Wight

UNITED STATES PATENT OFFICE.

DAVID R. McKIM, OF GOLD HILL, NEVADA.

VALVE.

SPECIFICATION forming part of Letters Patent No. 468,029, dated February 2, 1892.

Application filed June 30, 1891. Serial No. 398,044. (No model.)

*To all whom it may concern:*

Be it known that I, DAVID R. McKIM, a citizen of the United States, residing at Gold Hill, in the county of Storey and State of Nevada, have invented certain new and useful Improvements in Valves, of which the following is a specification.

My invention relates, particularly, to a straight-way valve which reciprocates in a valve-chamber between opposing ports.

The objects of my invention are to provide improved devices for preventing the rotation of the valve when operated to open and close the ports, means for insuring a tight fit of the valve in its seat, and appliances which admit of the valve being ground while in its casing.

In the accompanying drawings, Figure 1 is a vertical central section through the valve mechanism, the valve-stem being shown in elevation. Fig. 2 is a vertical section on the line 2 2 of Fig. 1. Fig. 3 is a transverse section on the line 3 3 of Fig. 1. Fig. 4 is a perspective view of a section of the separable valve. Fig. 5 is a perspective view of a modified form of valve.

The coupling A is provided with entrance and exit ports $a$ in line with each other. The valve-chamber A' is frustum-shaped, circular in cross-section, and gradually tapers inwardly from top to bottom, the top being closed by a removable screw-cap $A^2$. The valve-stem B, which is provided with a handle B', extends through a screw-threaded opening in the cap $A^2$ and connects with the valve C. Packing $b$ around the valve-stem at the end of the opening in the cap $A^2$ is held in place by the usual screw-cap follower $b'$. The valve C is made to accurately fit its seat, which is formed by the tapering walls of the valve-chamber. It is frustum-shaped, its lower edge $c$ being rounded to avoid sharp edges, which would tend to cut the valve-casing. By rounding the edges there is less liability of the edges being cut by steam or water. The walls of the valve-chamber are formed with vertical grooves $c'$, in which fit pins $c^2$, removably secured to the valve. The connection between the valve-stem and the valve is such that the stem may be turned relatively to the valve; but as the stem rises and falls the valve is moved in a corresponding direction, the pins $c^2$ preventing its rotation.

I may employ a valve made in one piece, as shown in Fig. 5, or, as I prefer, I may make it in sections. In either case the valve carries the removable pins $c^2$, and the stem is free to rotate relatively to the valve while lifting or lowering it. Nuts D D' are employed for holding the valve on the end of the stem. Normally these nuts are arranged to hold the valve loosely; but when it is desired to grind the valve the cap $A^2$ is removed, the pins $c^2$ withdrawn, and the nuts D D' tightened up. By then rotating the handle with the valve on its seat it may be accurately ground.

I preferably employ a valve made in two parts, as shown in Figs. 1 to 4, inclusive, as this construction enables me to insure a tight fit of the two gates or valve-sections in the valve-chamber, and when the valve is raised the gates yield and permit of the valve being unseated more easily. Each section of the valve is formed as shown in Fig. 4, which shows a semi-cylindrical hollow shell formed with a diaphragm or partition $e$, apertures $e'$ for the pins $c^2$, a recess $e^2$ for the nuts D D', and a seat $e^3$ for the cross-head or disk E, carried by the valve-stem.

When put together, as shown in Figs. 1 to 3, inclusive, the valve fills the valve-chamber between the ports and is free to be raised and depressed therein without any great degree of lateral movement; but it has sufficient lateral movement to vary the frictional contact between its periphery and the walls of the valve-chamber. The cross-head or disk E is mounted on the valve-stem B below a collar $e^4$ thereon. The collar, however, may be made sufficiently large to take the place of the disk E.

The operation of the valve will be clearly understood from the foregoing description. As shown in the drawings, the valve is closed. When the handle is turned in the proper direction, it will be raised to clear the ports $a$. When the valve-stem is first turned to raise the valve, the pressure on the cross-head is relieved and the two sections of the valve may come together to a slight extent to relieve the frictional contact. When operated in an opposite direction, the cross-head tends to force the sections of the valve apart to press them tightly against the walls of the valve-chamber.

The valve mechanism thus described is not only simple in construction, but it is easily operated and is durable, and an accurate seat for the valve may be readily maintained, as it may be ground with facility without the removal of the coupling from the pipes.

I claim as my invention—

1. The combination, substantially as hereinbefore set forth, of a coupling having entrance and exit ports in line with each other and formed with a conical valve-chamber, a conical valve movable back and forth between the ports and having a rounded lower edge $c$, a valve-stem loosely connected to the valve, nuts arranged in a recess $e^2$ in the bottom of the valve for rigidly connecting the valve to its stem, and pins removably connected with the valve and entering guides or grooves in the valve-chamber.

2. The combination, substantially as hereinbefore set forth, of a pipe-coupling having entrance and exit ports and formed with a conical valve-chamber, a conical valve movable in the valve-chamber, a valve-stem, a cross-head thereon engaging with the valve on its upper side, and nuts on the end of the valve-stem which hold the valve in position and by means of which the valve may be readily secured to its stem.

3. The combination, substantially as hereinbefore set forth, of a pipe-coupling having entrance and exit ports, a conical valve-chamber between the ports, a removable screw-cap over the chamber, a valve made in two parts and filling the chamber between the ports, a screw-threaded valve-stem engaging a screw-thread in the cap, nuts on the end of the valve-stem below the valve, and a cross-head on the valve-stem above the valve, and the removable guide-pins carried by the valve and extending into grooves in the valve-casing.

In testimony whereof I have hereunto subscribed my name.

DAVID R. McKIM.

Witnesses:
A. L. EDWARDS,
HARRY GILES.